May 11, 1937.  L. M. FRANCIS  2,080,123
RUNNING GEAR FOR VEHICLES
Filed Feb. 7, 1936 — 3 Sheets-Sheet 1
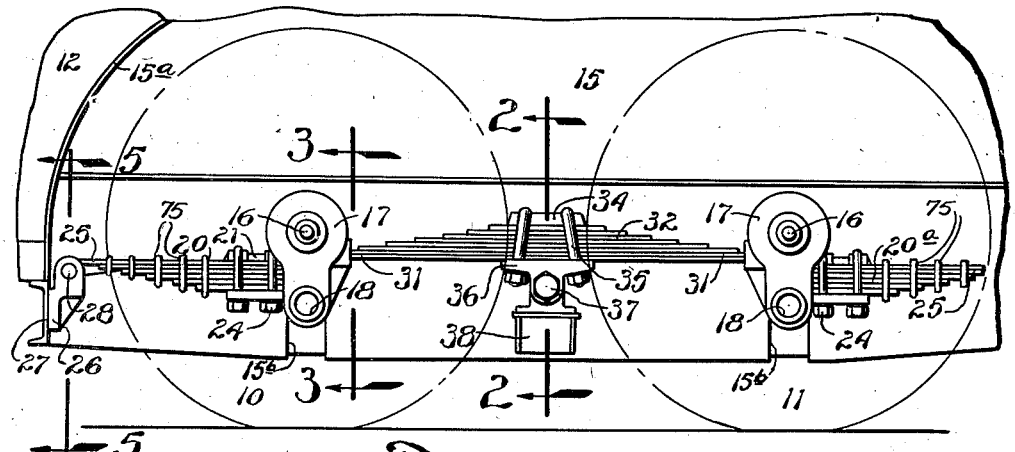
Fig. 1
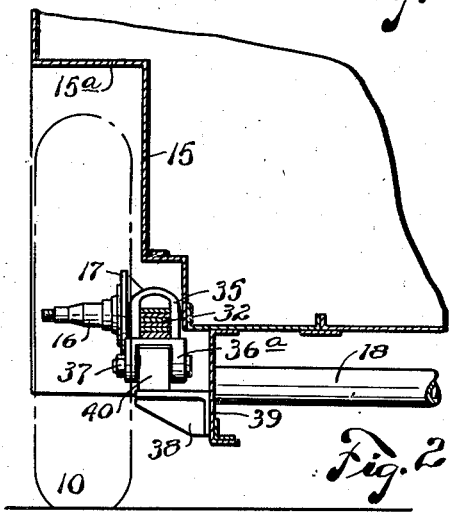
Fig. 2
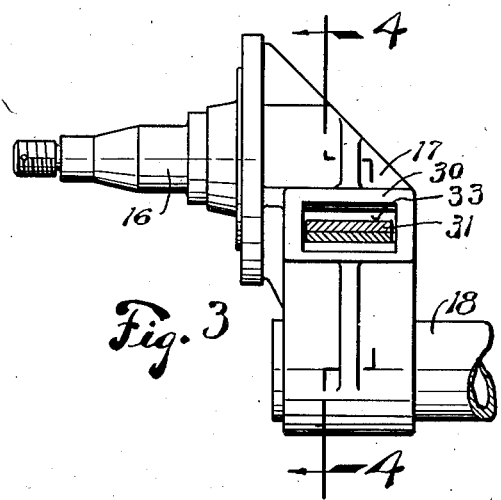
Fig. 3
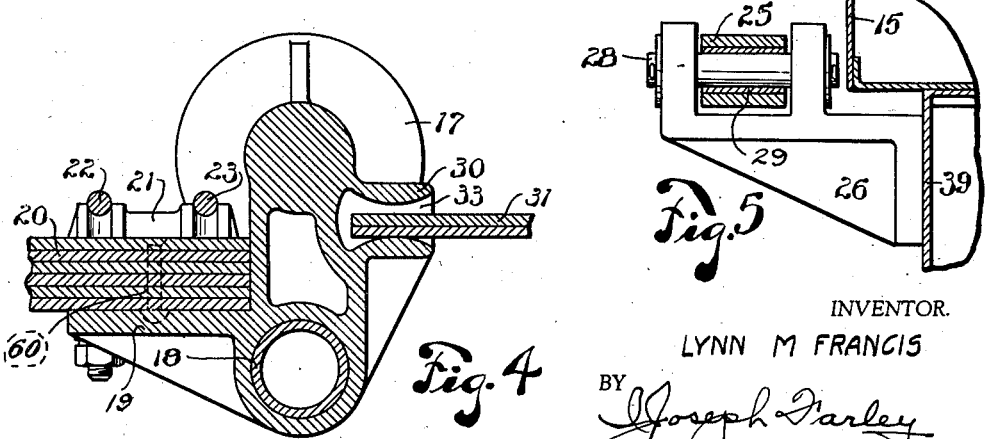
Fig. 4
Fig. 5
INVENTOR.
LYNN M FRANCIS
BY Joseph Farley
ATTORNEY.

May 11, 1937. L. M. FRANCIS 2,080,123
RUNNING GEAR FOR VEHICLES
Filed Feb. 7, 1936 3 Sheets-Sheet 2

INVENTOR.
LYNN M FRANCIS
BY Joseph Farley
ATTORNEY.

May 11, 1937.  L. M. FRANCIS  2,080,123

RUNNING GEAR FOR VEHICLES

Filed Feb. 7, 1936   3 Sheets-Sheet 3

INVENTOR.
LYNN M. FRANCIS
BY Joseph Naxley
ATTORNEY.

Patented May 11, 1937

2,080,123

UNITED STATES PATENT OFFICE 2,080,123

RUNNING GEAR FOR VEHICLES

Lynn M. Francis, Birmingham, Mich., assignor to Mechanical Handling Systems, Inc., Detroit, Mich., a corporation of Michigan Application February 7, 1936, Serial No. 62,754

10 Claims. (Cl. 280—104)

This invention relates to running gears for vehicles and has for its principal object to provide a new and improved spring suspension means for a pair of vehicle supporting wheels arranged in tandem relationship.

The invention has particular utility for trailer type of vehicles but it will be obvious, as the description proceeds, that the invention is not limited to use with this particular type of vehicle. The use of the invention with trailers is mentioned because of the fact that trailer types of jobs were formerly made of great length until a great many of the States passed laws restricting the length of vehicles using the State highways and in many cases included in such laws definite requirements as to the number of wheels that must be provided for trailers exceeding certain definite predetermined weights and dimensions. It has been found that the semi-trailer type of job, in which the front end of the trailer is pivotally connected, usually by a fifth wheel and supported upon the rear end of the truck or tractor, handles or maneuvers better on the road than the full trailer type of construction in which the trailer is supported by a set of rear wheels and a set of front wheels, or in which a pair of wheels is used in the center of the trailer. As the State laws require the provision of at least four supporting wheels for trailers exceeding certain lengths and weight, and as mechanical considerations also limit the maximum weight that can with safety be placed upon a pair of wheels, many different types of construction have been employed for providing the requisite number of supporting wheels without destroying the facility of the trailer to properly track in the wake of the tractor or draft vehicle. Among such constructions may be noted the pivotally mounted rigid walking beam type of structure carrying a pair of wheels arranged in tandem for supporting the rear end of the trailer. Also the dual wheel type which comprises a set of four wheels upon a single axle arranged in axially aligned pairs on each side of the vehicle. Either of the above constructions is subject to considerable objection. With the rigid walking beam tandem wheel type, great difficulty is encountered in providing a sufficient spring suspension without unduly increasing the overall height of the job. Moreover, the rigid connection provided by the walking beam between the two spaced tandem wheels holds the wheels in a more or less rigid alignment in a plane extending fore and aft, with the result that when the vehicle is turning a curve, the wheels cannot adjust themselves to the turning movement and consequently great strain and excessive wear is placed upon the bearings and tires. The dual wheel construction, while satisfactory from an operating standpoint, is subject to the objection that the wheel housings project too far into the load carrying space of the body.

In many types of vehicles it is of the utmost importance that the overall height of the vehicle be reduced to the greatest possible extent, this requirement being quite acute in connection with vehicles of the type known as haulaway jobs employed for the transport of fully assembled automobiles from the factory to the dealers or distributors. Vehicles of the last mentioned type for obvious reasons are usually constructed as light as consistent with sound engineering, considering the loads to be carried, and in many instances consist merely of an open framework upon which tracks are mounted for supporting the automobiles to be carried. After the delivery of the loads the vehicles are usually returned unloaded to the assembly plants and it has been found that the wear and tear on the jobs on their unloaded return trips is very much greater than when they are used fully loaded, because of the excessive vibration placed upon the structure, which vibration is accentuated by the higher speeds used when returning unloaded. It is this vibration that constitutes the major factor of deterioration in constructions of this type.

Having in mind the above, the present invention has for one of the principal objects to provide a construction which will overcome the objections above set forth.

A further object is to provide a tandem wheel type of running gear in which the members of the pair of tandem wheels are so supported as to be capable of vertical movement relative to each other, but being so inter-connected as to effect a limited interdependence of operation in a manner that will substantially simulate the action of a single supporting wheel with respect to tracking or trailing properties.

Another object is to construct a tandem wheel running gear in which the members of the pair of tandem wheels will have sufficient limited swiveling movement independently of each other so as to tend to permit each wheel automatically to adjust itself in a substantially correct tangent line to a curve about which the vehicle is being drawn without undue strain or excessive wear being placed upon the bearings or the tires.

It is a further object of the present invention to incorporate with a tandem wheel running gear of the type above described, a new and improved spring suspension which will prevent the excessive destructive vibration referred to above. Considered more specifically, it is an object of the present invention to provide a pair of tandem wheel vehicle supporting wheels with a spring suspension consisting of a plurality of springs so interconnected as to support each wheel for substantially independent vertical movement.

It is also an important object to procure the desired resilience and flexibility of a very large spring by means of a plurality of inter-connected comparatively short spring units by means of which the requisite structural compactness may be obtained, the cost of manufacture and installation may be reduced and a more durable construction provided.

Further it is the object to provide a construction in which all of the advantages of flexibility and resilience obtainable by the use of long, single spring suspension, may be incorporated in a construction in which the wheels of the tandem pair are maintained in closely coupled inter-connected relationship.

The above and other objects of the invention will appear more fully from the following detailed description and by reference to the accompanying drawings forming a part hereof wherein is shown, by way of illustration, a constructional example which has proven highly satisfactory in practical operation.

In the drawings, Fig. 1 is a side elevation of a pair of tandem vehicle supporting wheels and a spring suspension therefor, constructed in accordance with the principles of the present invention.

Fig. 2 is a transverse, vertical section taken substantially on the line 2—2 of Fig. 1;

Fig. 3 is an enlarged detail in transverse vertical section, taken on the line 3—3 of Fig. 1;

Fig. 4 is a longitudinal, vertical section on the line 4—4 of Fig. 3;

Fig. 5 is an enlarged detail in section, taken on the line 5—5 of Fig. 1;

Figure 8:
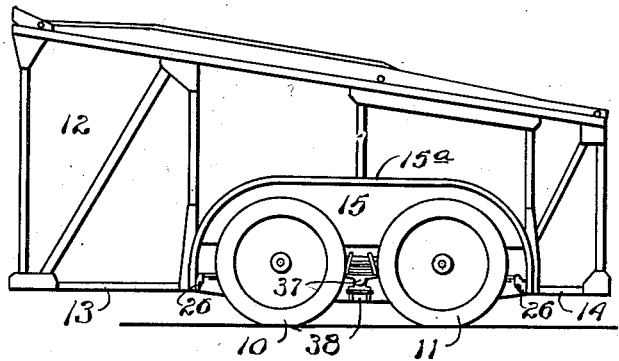
Fig. 8 is a side elevation more or less diagrammatically illustrating a type of vehicle with which a pair of tandem supporting wheels of the type disclosed may be advantageously incorporated.

Referring first to Fig. 8 of the drawings, the reference characters 10 and 11 indicated a pair of vehicle supporting wheels arranged in tandem relationship and upon which the body 12 is suitably supported. The body 12 consists of a structural framework including a pair of lower structural members 13 and 14 at each side of the vehicle, suitably inter-connected by transversely extending braces. Interposed between the members 13, 14, and suitably connected therewith is a flanged side plate 15, the flange 15a of which is secured to the opposed inner ends of the members 13, 14.

As shown most clearly in Figs. 1 to 5 of the drawings, each wheel 10, 11 is mounted upon a trunnion bearing 16 projecting laterally from a bracket 17, which at its lower end is provided with a bearing for, and is secured upon, an axle 18, preferably of tubular construction. The axles 18 may, as shown, project through a vertically extending slot 15b in the side plate 15 and extend across to the other side of the vehicle where they are similarly connected to other brackets 17 carrying wheels similar to the wheels 10, 11. Each bracket 17 is similar in construction, with the exception that they are arranged in pairs, one bracket being, what may be termed, a right hand, and the other a left hand bracket. Each bracket is provided with a flange or shelf portion 19, the flange 19 of the bracket 17 for the front wheel 10 extending forwardly, and that for the rear wheel 11 extending rearwardly. Each shelf 19 serves a support for a plurality of spring leaves 20 and 20a respectively, the leaves 20 being for the front wheel 10, and the leaves 20a for the rear wheel 11. These spring leaves are securely clamped to the shelf 19 by means of a clamping block 21 provided with suitable recesses for the reception of a pair of U-bolts 22, 23, the lower ends of which pass through suitable apertures in the shelf 19 and are threaded for the reception of nuts 24. The leaves of each set, in accordance with the usual construction of devices of this character, are of gradually increasing length so that the upper leaf 25 projects at its end beyond the other leaves and is coiled back upon itself to form an eye which serves as a means for securing the more flexible end of the spring to the vehicle body. The means for so fastening the spring units 20 and 20a to the body consists of a bracket 26 suitably secured to a transverse channel member 27 which forms part of the structural framework of said body. As shown in Fig. 5, the upper end of the bracket 26 is formed in the shape of a clevis, between the jaws of which the end of the spring leaf 25 projects. Suitable apertures are provided in the clevis jaws to receive a bolt or pin 28 which passes through the eye at the end of the spring leaf 25 and serves to connect the end of the spring leaf 25 for vertical pivotal movement about the pin 28, a bushing 29 being interposed between the pin 28 and spring eye.

On the side opposite the shelf 19 each bracket 17 is provided with an apertured boss, or lug, 30 into which is received the ends of the two longer leaves 31 of a spring unit 32, the spring ends 31 fitting slidably into the aperture 33 of said boss 30 and having limited vertical movement relatively thereto. At its central point the spring unit 32 is securely clamped by means of a clamping block 34 and U-bolts 35 to a fitting 36 pivotally connected by means of a bolt 37 to a supporting bracket 38 which is rigidly secured to, and supported by, a longitudinally extending channel member 39 which forms part of the structural framework of the body. The connection between the fitting 36 and bracket 38 is effected by an upwardly extending lug 40 of the bracket 38 which is embraced by the arms 36a in the form of a clevis which extend downwardly from the fitting 36, the clevis arms 36a and lug 40 being suitably apertured to receive the connecting pivot bolt 37.

Figure 6:
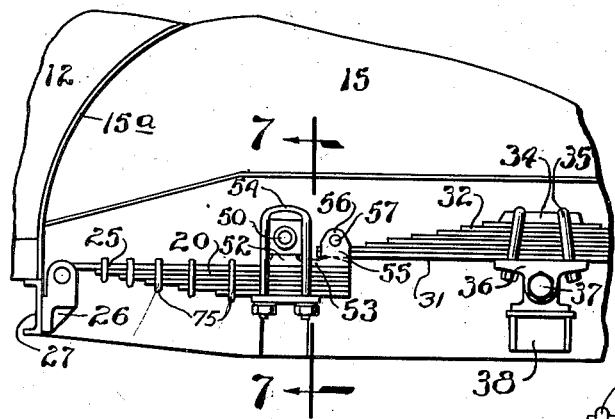
Fig. 6 is a view similar to Fig. 1, partly broken away, showing a modified form of construction.
Figure 7:
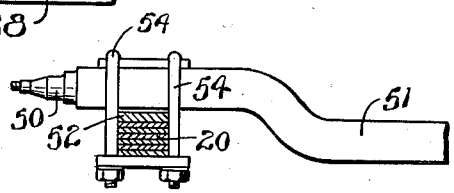
Fig. 7 is a section on the line 7—7 of Fig. 6.

In the form shown in Figs. 6 and 7 the construction of the spring 32, fitting 36 and bracket 38 is identical with that shown in Figs. 1 to 5. Likewise the construction of the spring members 20 and 20a, (the latter not being shown) with their spring leaves 25, and the connection of the latter to the brackets 26 is the same with the exception that instead of employing a bracket, as indicated by the reference character 17, the spring units 20 are extended past the axis of the wheel.

As shown in Fig. 7, the wheels are supported on bearings 50 formed on the ends of drop axles 51. Adjacent to the bearings 50 each axle passes through a spring block 52 formed in a bracket or fitting 53, the spring being clamped to the spring block 52 by means of U-bolts 54. The bracket 53 is provided with a lateral extension 55 having a pair of spaced yoked jaws 56 apertured for the reception of a pin 57. The ends of the two lower spring leaves 31 of the spring unit 32 are slidably received between pin 57 and the yoked end of bracket 55 for limited vertical movement in a manner similar to that shown in connection with the construction shown in Figs. 1 to 5.

Figure 9:
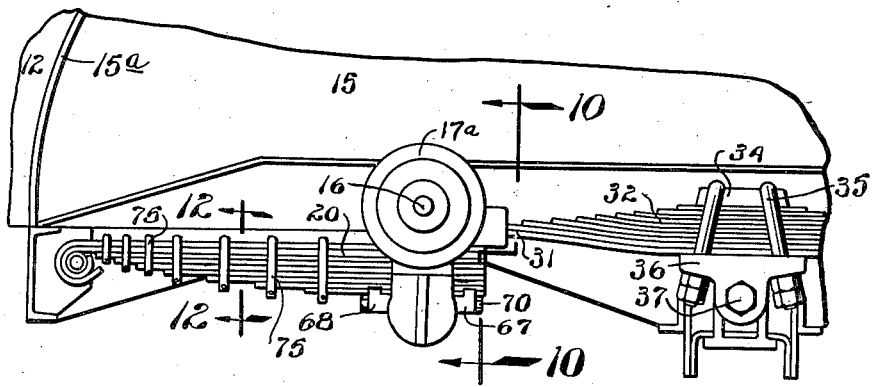
Fig. 9 is a view similar to Figs. 1 and 6, partly broken away, showing another modified form of construction.
Figure 10:
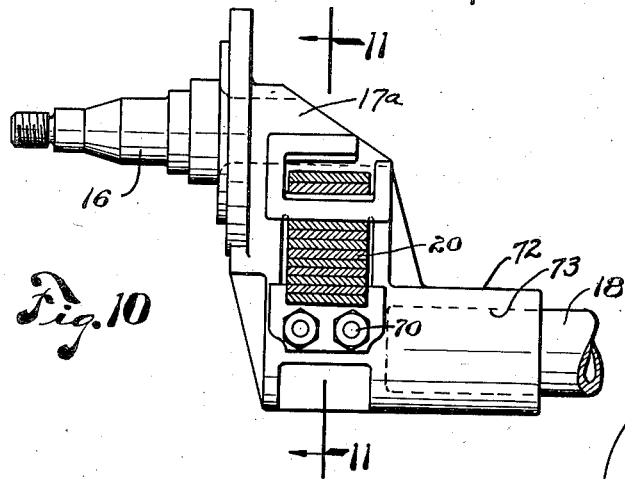
Fig. 10 is an enlarged detail in transverse vertical section, taken on the line 10—10 of Fig. 9.
Figure 11:
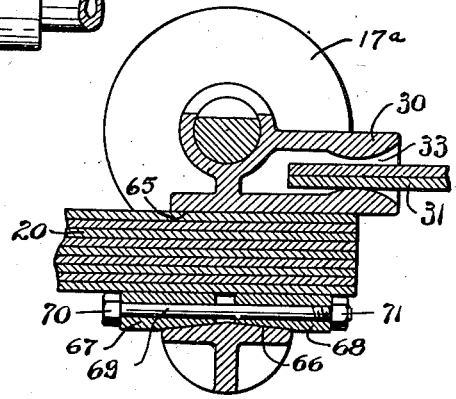
Fig. 11 is a longitudinal, vertical section on the line 11—11 of Fig. 10.
Figure 12:
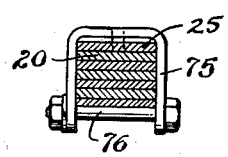
Fig. 12 is a section on line 12—12 of Fig. 9.

In the forms shown in Figs. 9, 10 and 11 a modified form of fitting 17a is used wherein the end of the spring 20 is secured to the fitting 17a by a wedge construction. As shown best in the enlarged detail view, Fig. 11, the spring 20 projects through an opening 65, provided in the fitting below the axle spindle, which opening is materially deeper than is required by the vertical height of the spring leaves. The bottom surface of the said opening 65 is beveled from each side towards the center, as shown at 66 in Fig. 11 and a pair of wedges 67, 68 are placed under the spring between its lower surface and the beveled surfaces 66. The wedges 67, 68 are provided with aligned holes 69 through which bolts 70 are placed and by means of nuts 71 the two wedges 67, 68 are drawn towards each other. As will be apparent from Fig. 11, this tightly grips the spring leaves and rigidly secures them to the fitting 17a. As shown in Fig. 10, this type of fitting 17a provides a slight modification in the means of securing the axle to said fitting, a projection 72 with a bore 73 suitable to receive the end of a straight axle being provided.

As will be seen from the foregoing, each spring unit 20, 20a is a half spring which forms a complement of, and in turn is complemented by, the adjacent half of the spring unit 32, but each spring unit 20 and the central spring unit 32 exerts its spring action substantially independent of the other.

It will be noted that in each form of the invention the connection between the ends of the spring leaves 31 of the central full spring 32 and the bracket member to which the larger ends of the spring units 20 and 20a are supported, is a loose sliding connection with sufficient lost motion to permit limited vertical movement as shown most clearly in Figs. 3 and 4. As also shown in Fig. 3, there is a slight amount of transverse play between the sides of the spring leaves 31 and the bracket 17.

For the purpose of binding the leaves of the half spring units 20 and 20a together, a rivet 60 (see Fig. 4) is passed through suitable apertures provided adjacent the larger end of the spring unit, as is the usual practice with devices of this character.

The use of brakes with this means of spring suspension requires some special compensation for holding the spring leaves of the spring 20 when said brakes are applied. This problem arises because of the fact that, as will be apparent from consideration of Fig. 1, both the brackets 17 will be twisted counter-clockwise by the braked wheel and the tendency will be, in such a condition, to spread the leaves of the spring 20 shown at the left in Fig. 1. There is therefore provided as shown in Figs. 1, 6, 9 and 12 U-shaped clips 75 located near the end of each spring leaf and placed on the spring assembly 20 in such location that a pin, or bolt, 76 rests against and holds the ends of the spring leaf together. Each clip 75 is secured against sliding along the spring by rivets to the topmost spring leaf 25, all as shown best in Fig. 12. Clips are also provided on spring assembly 20a shown at the left in Fig. 1, although these leaves are not spread by brake action.

It will be noted that the full spring 32 forms in effect a pivoted resilient walking beam interposed between the two wheels 10 and 11, but which is not rigidly connected to said wheels as in the prior art rigid walking beam type of construction. The half spring units 20 and 20a are, however, rigidly connected to the wheel spindles but are attached by their pivotal connection to the brackets 26 to swing about the axis of the pins 28. Were it not for the provision of the central full spring 32, each wheel would be free to swing about the axis of the pin 28, the rigid connections of the springs 20a serving to hold the axis of the wheels in an arcuate path with the axis of said pin 28 as a center. The lost motion connection of the ends of the main central spring 32 to the bracket 17 and fittings 53 respectively serves, however, to limit the extent of, and resist the movement of the wheels in such an arcuate path. Considering each of the half springs 20, 20a as a beam, it will be seen that the ends of the spring 32 would serve as one support for each beam while the connection of the spring leaves 25 to the brackets 26 would serve as the other support. As the distance from the axis of the wheel to the pin 28 and bracket 26 is several times that of the distance from the axis of the wheel to the support provided by the spring leaves 31 against the bracket 17, the major portion of the reaction is transmitted to the center, or main spring 32, the dimensions in the actual construction being such that approximately one-fifth of each axle load is transmitted to the pin 28 and the balance transmitted to, and carried by, the main spring 32.

Of course it will be understood that under conditions of maximum deflection, and also considering that it is a spring structure and not a rigid beam being dealt with, the load distribution above given would have to be modified accordingly. It will also be understood that should, say, the forward wheel 10 of the tandem pair shown in Fig. 1 strike an obstruction in the road which would tend to force the wheel 10 upwardly a considerable distance, the upward movement of the wheel would be mainly resisted by the spring 32 which will pivot about the axis of the bolt 37 which connects the spring to the supporting bracket 38, the forces and reactions resulting therefrom being in part transmitted to the bracket 17 for the rear wheel 11 of the tandem pair and being largely absorbed, however, in producing flexure of the spring leaves of the spring 32. The forces transmitted to the bracket 17 of rear wheel 11, it will be seen, are exerted on the relatively short moment arm from the point of contact of the springs 31 with the bracket 17 of wheel 11 to the axis of the wheel 11 and these forces are absorbed by the action of the rear half spring 20a resulting in flexure of the spring leaves and some reaction on the rear pin 28. It will thus be seen that forces due to shocks and corresponding movement of the wheels are transmitted to, and resisted by, the entire length of the spring units which in the actual construction provides a spring support having a length of between 7 and 8 feet.

When turning curves the transverse side play between the spring 25 and clevis jaws of the bracket 26 will permit a limited amount of transverse movement of the brackets 17, a very small amount of clearance permitting a very much larger transverse movement of the wheels due to the multiplication resulting from the long lever arm formed by each of the spring units 20a. This transverse movement of the wheels is also permitted by the loose sliding connection between the ends of the spring leaves 31 and the bracket 17 and is further permitted by the inherent resilience of the springs 32 and 20. Consequently the wheels 10 and 11 tend automatically to adjust themselves to a substantially tangent position to any curve about which the vehicle is traveling without any undue or excessive strain or wear being placed upon the wheel bearings or the tires.

It is further to be noted that the mounting of the wheels upon the spring units 20 and 20a with the axis of the wheels above the spring units, permits a limited fore and aft movement of the wheel spindles resisted by the springs which also contributes to the wheels adjusting themselves automatically in tracking around a curved path. In connection with the fore and aft movement above described, it will of course be understood that sufficient play is provided between the slots 15b and the plate 15 and the cross axles 18 and 51 respectively to permit of such movement, the bracket 17 and fittings 53 not being connected to any rigid part of the framework but being supported entirely by the axles 18 and 51, which in turn are merely supported by their respective brackets and fittings so that transverse movement of the cross axles as a whole is permitted to a limited extent except as restrained by the action of the springs.

It is further to be noted that the movement of each axle is practically independent of the other, there being no rigid radius rod connections of the axles either to each other or to the vehicle body, the only connection between the axles being effected through the springs 32 which permits free fore and aft movement as well as transverse movement as above described.

The arrangement of the springs is such that the two half end spring sections cooperate with the center main spring to function as snubbers each for the other. This is due to the fact that the reaction of the longer leaves 31 of the main spring section 32 bears upon the projecting shelf of each of the brackets 17 in the form shown in Figs. 1 to 5, likewise on bracket 17a in the form shown in Figs. 9 to 11 and on the projecting end of each of the fittings 53 in the form shown in Figs. 6 and 7, these projecting portions being located on the side opposite the center line of the wheel from that on which the bracket 26 is mounted and to which the pivotal connection for the end of the spring is made. Considering the movements of the parts and forces involved when the wheel 10, for example, is caused to move upwardly by striking an obstruction in the road, the reaction of the forward end of the spring 32 on the rearward projection of the bracket 17 of wheel 10 will tend to rotate the bracket 17 in a clockwise direction which obviously will produce a flexure or distortion of the half spring 20, during which flexure of the spring 20 the spring 32 will also have been subjected to a corresponding distortion. When the maximum extent of movement has been reached, the energy stored up in the large spring 32 tends to force the wheel downwardly, the releasing action of the spring 32 being exerted on the rearward projection of the bracket 17 in a direction such as to also produce clockwise rotation of the bracket 17 but the spring 20 having been distorted in the same direction by the vertical movement of the wheel resists the releasing action of the main spring 32 by its inherent tendency to resume its unloaded, unflexed position, which exerts itself in a direction to produce counter-clockwise rotation of the bracket 17 of wheel 10. It will thus be seen that any excessive rebound effect of either the spring 32 or the short spring 20, is resisted by the manner in which the springs are associated in what may be termed opposed relationship.

Considering the entire spring unit together as disclosed in Fig. 1 it is noted that the brackets 17 provide reaction supports for the ends of the pivoted central spring 32, and that these reaction supports are offset from the axis of rotation of the wheels 10 and 11 in such a direction that both reaction supports are between the tandem wheel axles. The offset is important in that the reactions are such as to distribute the wheel loads to the several springs in such manner that a snubbing action is obtained by the opposed action as above outlined. Also because of the offset position of the reaction supports between the axles, the loads are so distributed that the road shocks from each wheel are absorbed thru the entire spring unit, thus gaining the advantage of a long spring in a closely coupled tandem wheel unit.

While I have shown a satisfactory, constructional example of a running gear and spring suspension therefor, which has proven highly satisfactory in actual use, it will be understood that the invention is not limited to the specific constructional details described and illustrated but that many variations, changes and modifications may be resorted to without departing from the principles of the invention. For example, it will be obvious that the configuration of the brackets 17 may be considerably varied as well as the manner of securing or anchoring the spring units to their respective supports. Likewise the relative distances between the axes of rotation of the wheels and the cross axles as well as the position of the latter relative to the frame may be varied as desired. Other changes and variations will obviously suggest themselves to those skilled in the art.

I claim:

1. A running gear for vehicles comprising two pair of wheels arranged in tandem, one on each side of the vehicle, cross axles connecting said wheels and means for connecting said axles for limited vertical transverse and fore and aft movement relatively to each other, said means comprising a plurality of separate spring units consisting of a main spring interposed between said axles, reaction supports for the ends of said main spring secured to and located between said axles, and a pair of short spring sections extending forwardly and rearwardly respectively of the forward and rear axles.

2. In a vehicle having a frame, a pair of supporting wheels arranged in tandem formation, axles upon which said wheels are rotatably mounted, a main spring pivotally supported intermediate its ends to said frame between the axles of said wheels, a pair of auxiliary spring units one rigidly secured to each of said axles and projecting to the side thereof opposite said main spring, means for securing the ends of said auxiliary springs to said frame, and a pair of projections one for each axle extending from the other side of each axle and rigidly associated with each of said auxiliary springs and its respective axle against each of which projections one end of said main spring is engaged with a yielding pressure.

3. In a vehicle a frame, a pair of supporting wheels arranged one behind the other, axles upon which said wheels are rotatably mounted and means for mounting said wheels for independent limited vertical, lateral and longitudinal movement, said means comprising a plurality of springs consisting of main spring means located between the axles of said wheels and having the free ends thereof terminating adjacent to and inside said axles, a pair of auxiliary springs one rigidly connected to each of said axles and projecting to the side of its respective axle opposite to that upon which said main spring means lies, a projection rigidly associated with each of said wheel axles and its auxiliary spring extending from the other side of said axle towards said main spring means and forming a reaction support for the adjacent free end of said main spring means, said main spring means and said auxiliary springs cooperating to resist vertical movement of each respective wheel and being wound in opposite directions by said vertical movement whereby upon recoil of said springs each spring will mutually oppose recoil action of the other.

4. A construction as defined in claim 3 in which said main spring is pivotally mounted intermediate its ends so that vertical movement of one wheel will be communicated through said spring to be absorbed by the spring suspension of the other wheel.

5. The combination of a spring suspension with a supporting wheel and a vehicle frame, an axle, a spring having one end rigidly connected to said axle and the other end pivotally mounted on said frame to cause said wheel during vertical movement thereof relative to said frame to be constrained to move in the arc of a circle about said pivotal connection as a center, a reaction support for said spring offset from said axle on the side thereof opposite the pivotal mounting of said spring and resilient means supported from said frame acting upon said reaction support but cooperating with said spring to resist vertical movement of said wheel.

6. The combination of a spring suspension with a supporting wheel and a vehicle frame, an axle for said wheel, a longitudinally extending resilient member, a pivotal mounting for connecting one end of said resilient member to said frame, connecting means rigidly securing said axle to said member, a reaction support rigidly mounted relative to said axle and said member and offset from said axle on the side thereof opposite to said pivotal mounting, a spring secured to said vehicle frame and having an end thereof supported on said reaction support.

7. The combination of a spring suspension with a pair of supporting wheels arranged in tandem, a vehicle frame, axles for said wheels, a pair of longitudinally extending resilient members one secured to each of said axles, pivotal mountings connecting the outer end of each of said resilient members to said frame, reaction supports located between said tandem wheels for the inside ends of said resilient members, and a spring pivotally mounted at its center to said frame and having its ends supported on said reaction supports.

8. In a tandem wheel suspension for a vehicle frame, a pair of axles, wheels rotatably mounted on said axles, a pair of brackets on said frame providing pin connections one forward and one rearward of said axles, resilient longitudinally extending members connecting said axles one with each of said pin connections thereby defining the movement of said axles and wheels in arcs about said pin connections, reaction supports rigidly secured relative to said axles and offset on the sides thereof opposite to said pin connections, and a spring pivotally mounted at its center to said frame between said axles and mounted with its ends reacting upon said reaction supports thereby to yieldably resist the aforesaid arcuate movement of said axles.

9. In a tandem wheel suspension for a vehicle frame, a pair of axles, wheels rotatably mounted on said axles, a pair of brackets on said frame providing connections one forward and one rearward of said axles, resilient longitudinally extending members connecting said axles one with each of said frame connections, reaction supports rigidly secured relative to said axles and offset on the sides thereof opposite to said frame connections and a spring pivotally mounted at its center to said frame between said axles and mounted with its ends reacting upon said reaction supports thereby to yieldably resist the movement of said axles.

10. In a vehicle having a frame and a running gear therefor comprising two pairs of supporting wheels the members of each pair being arranged in tandem relationship on each side of said vehicle, a pair of cross axles connecting the forward and rear member of each pair of wheels with the forward and rear members of the opposite pair of wheels, a bracket secured to each end of each of said axles, each of said brackets having a wheel spindle projecting laterally therefrom, a spring unit for each of said wheels consisting of a plurality of laminated spring leaves, means for rigidly connecting said spring unit adjacent its one end to said bracket, means connecting the other end of said spring unit to said frame, a second spring extending between the two brackets for the members of one of said pairs of tandem wheels, said brackets being provided with means extending longitudinally between said wheel spindles for engagement with the ends of said second spring, and means for connecting said second spring intermediate its ends to said frame.

LYNN M. FRANCIS.